US 8,738,746 B2

(12) United States Patent
White et al.

(10) Patent No.: US 8,738,746 B2
(45) Date of Patent: May 27, 2014

(54) CONFIGURATION MANAGEMENT FOR REAL-TIME SERVER

(75) Inventors: Seth White, San Francisco, CA (US); Alexandre de Castro Alves, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1120 days.

(21) Appl. No.: 12/014,914

(22) Filed: Jan. 16, 2008

(65) Prior Publication Data

US 2009/0132801 A1    May 21, 2009

Related U.S. Application Data

(60) Provisional application No. 60/988,648, filed on Nov. 16, 2007.

(51) Int. Cl.
*G06F 9/00* (2006.01)
*G06F 1/24* (2006.01)
*G06F 15/173* (2006.01)

(52) U.S. Cl.
USPC ............... 709/221; 709/220; 713/1; 713/100

(58) Field of Classification Search
USPC ............ 709/201, 224; 707/104.1, 737; 713/1, 713/100
See application file for complete search history.

(56) References Cited

U.S. PATENT DOCUMENTS

| 7,099,879 | B2 * | 8/2006 | Tacaille et al. ................ 707/737 |
| 7,376,534 | B2 * | 5/2008 | Shrivastava et al. .......... 702/182 |
| 7,389,921 | B2 * | 6/2008 | Lin et al. ....................... 235/385 |
| 7,546,606 | B2 * | 6/2009 | Upton ............................ 719/318 |
| 7,617,479 | B2 * | 11/2009 | Hambrick et al. ............. 717/104 |
| 2006/0048097 | A1 * | 3/2006 | Doshi ............................ 717/120 |
| 2006/0195473 | A1 * | 8/2006 | Lin et al. ..................... 707/104.1 |
| 2008/0010308 | A1 * | 1/2008 | Erdogan et al. ............... 707/101 |
| 2008/0307211 | A1 * | 12/2008 | An et al. ............................ 713/1 |
| 2009/0070765 | A1 * | 3/2009 | Alves et al. ................... 718/103 |
| 2009/0070785 | A1 * | 3/2009 | Alvez et al. ................... 719/318 |
| 2009/0070786 | A1 * | 3/2009 | Alves et al. ................... 719/318 |
| 2009/0276660 | A1 * | 11/2009 | Griffith et al. ................... 714/16 |

* cited by examiner

*Primary Examiner* — Tae Kim
(74) *Attorney, Agent, or Firm* — Meyer IP Law Group

(57) ABSTRACT

A Realtime Event Server comprising a component to operate on data from data streams; and a configuration system adapted to supply configuration for the realtime event server, the configuration including dynamic configuration, the dynamic configuration being changeable without restarting the component.

19 Claims, 4 Drawing Sheets

CONFIGURATION MANAGEMENT FOR REAL-TIME SERVER

CLAIM OF PRIORITY

This application claims priority to U.S. Provisional Application No. 60/988,648 entitled "CONFIGURATION MANAGEMENT FOR REAL-TIME SERVER" by Seth White, filed Nov. 16, 2007, which is hereby incorporated by reference.

BACKGROUND

Event processing is becoming more and more popular. In a complex event processor, streams of data are evaluated in real time. Because of the amount of data and the operation speeds required, the data is typically not stored into a database before it is processed.

DETAILED DESCRIPTION

Figure 1:
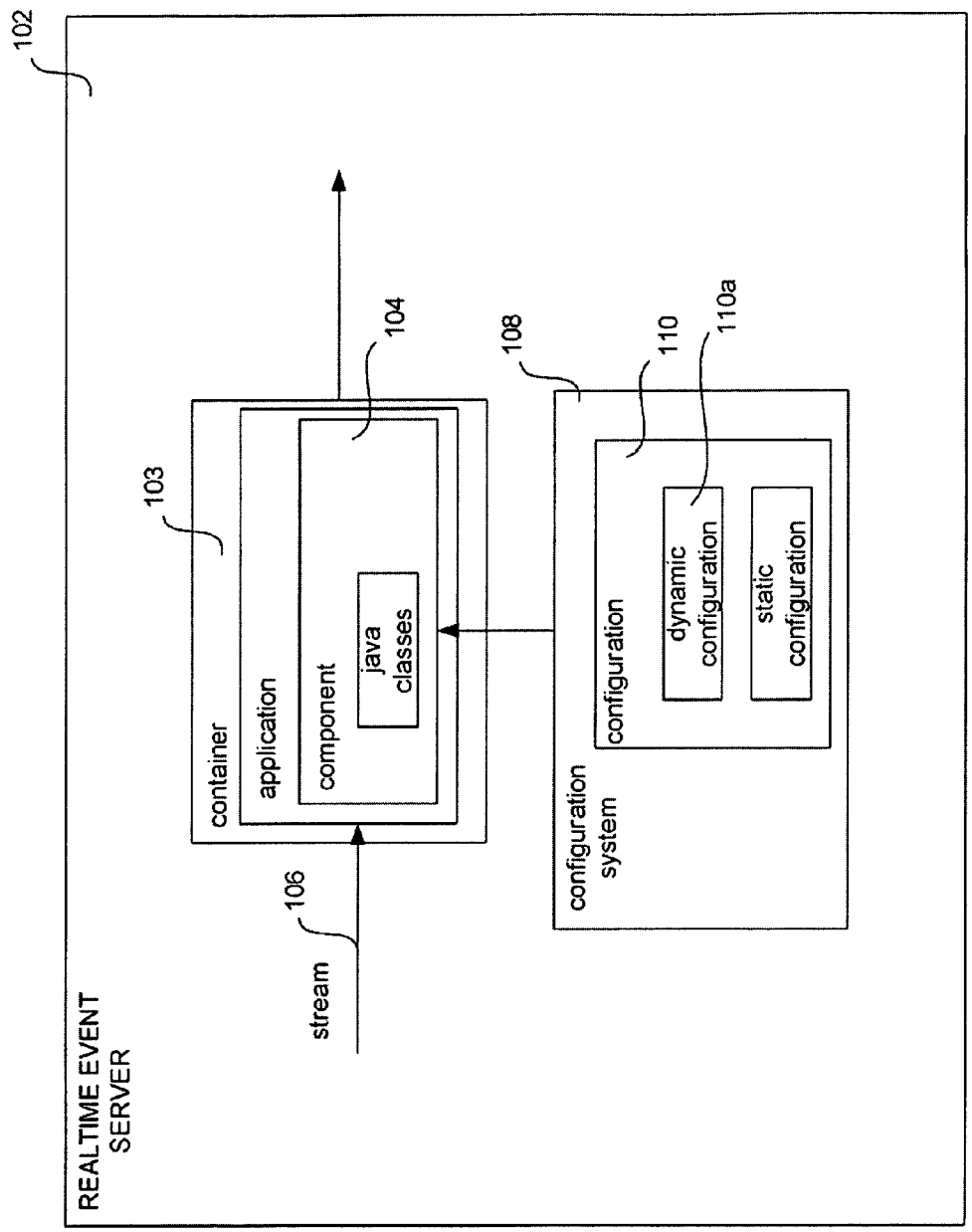
FIG. 1 illustrates a realtime server of one embodiment of the present invention.

One embodiment, of the present invention, is a Realtime Event Server 102 comprising a component 104 to operate on data from at least one data stream 106. A configuration system 108 can be adapted to supply configuration 110 for the realtime event server. The configuration 110 can include dynamic configuration 110a. The dynamic configuration 110a can be changeable without restarting the component.

The component 104 can be a real-time processor, an adapter or any other component that is part of an event driven application. The component can include arbitrary user written components. For example, a user could write their own component which executes arbitrary logic and also create customized dynamic configuration for that component. The component can be a stage in the event processing network for the application, or not, in which case it can be a component used by a stage component to perform some task.

The component can be associated with a configuration listener that updates the configuration at the component.

The component can have lifecycle methods for receiving the dynamic configuration.

The lifecycle methods can include a prepare lifecycle method, an activate lifecycle method and a rollback lifecycle method.

Embodiments of the present invention can include a container 103 to host components that operate on data from at least one data stream. A configuration system can be adapted to supply configuration for the realtime event server. The configuration can include dynamic configuration. The dynamic configuration can be changeable without restarting the component.

The component can be associated with a configuration listener that updates the configuration at the component. The configuration listener can use callbacks to the component to update the dynamic configuration.

The configuration system 108 can analyze the class 104a to determine the configuration data to load to the component.

The configuration data can include static and dynamic configuration data.

The class 104a can be a JAVA class derived from an XML schema.

Embodiments of the present invention can be a realtime event server 102 including a container 103 to host a component 104 to operate on data from a data stream 106. A configuration system 108 can be extensible to new types of configuration data by the creator of the component 104.

The configuration system 108 can analyze a class 104a in the component 104 to determine the configuration data to load to the component.

Figure 2:
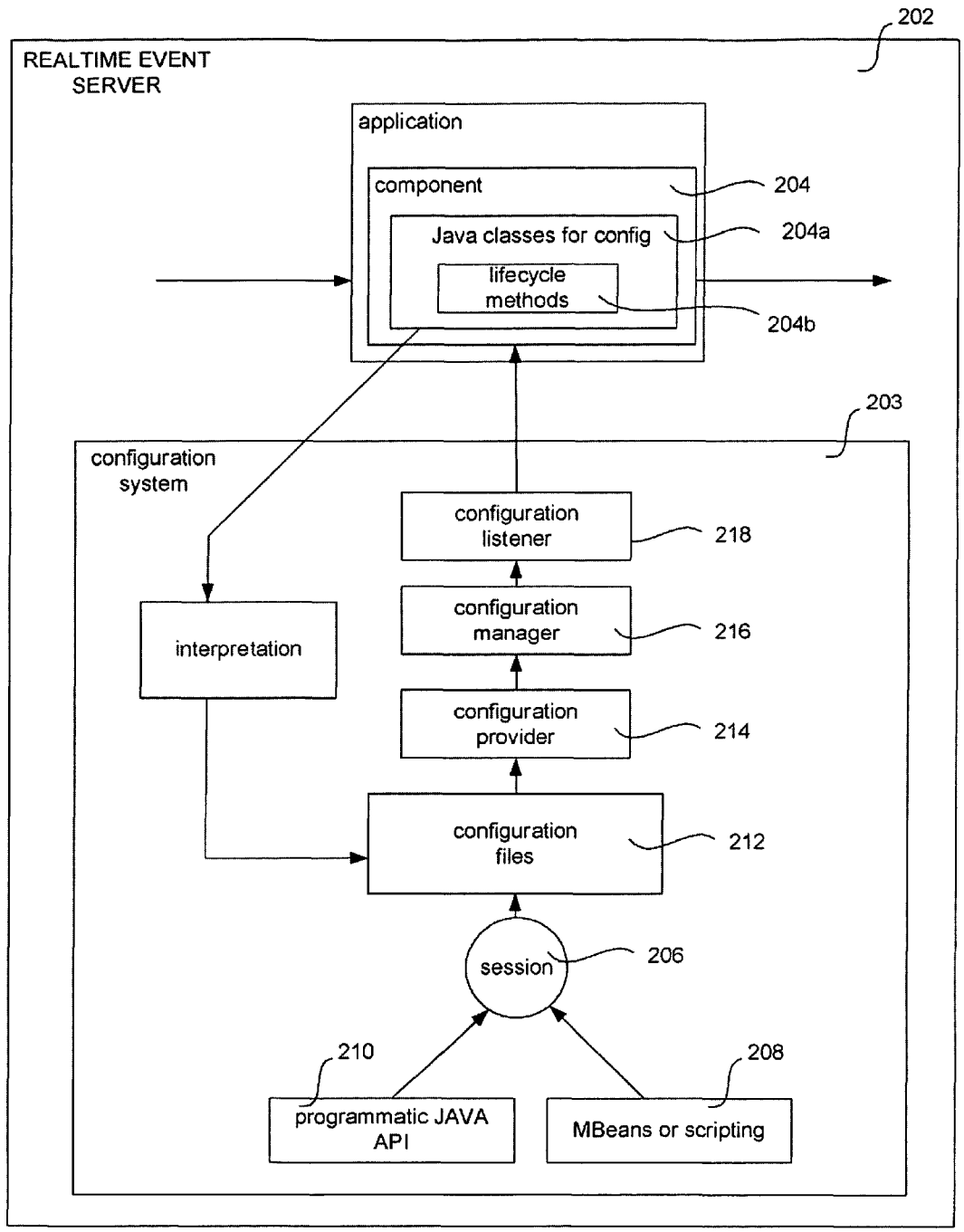
FIG. 2 illustrates an example of a configuration system for a realtime server of one embodiment of the present invention.

FIG. 2 illustrates an embodiment of a realtime event server 202. To update the configuration of the component 204, a session 206 can be set up by MBeans or scripting 208 or through a programming JAVA API 210. The session 206 can update a persistent store of configuration files 212. The updating of the configuration can use concurrent version control to ensure that conflicting updates are not done and so that the updates can be done transactionally.

A configuration manager 214 can put the configuration from the persistent store of configuration files into the configuration manager 216 that can act as an in memory database.

Configuration listener 218 can push the updated configuration to components 204. In one embodiment, lifecycle callbacks can be used. A prepare phase can indicate to the components that it should prepare to make a configuration update. An activate phase can be done after all of the relevant components indicate that the configuration change can be done. Alternately the prepared change can be rolled back in a rollback phase. The components 204 can have JAVA classes 204a with lifecycle methods 204b for the prepare, activate and rollback.

In this way, the configuration can be sent to the component 204 without restarting the component 204.

In one embodiment, the configuration types can be modified by the designer of the application containing the components. In one embodiment, the JAVA class 204a can be interpreted by the configuration system 203 to determine the type of configuration that the components can use.

Figure 3:
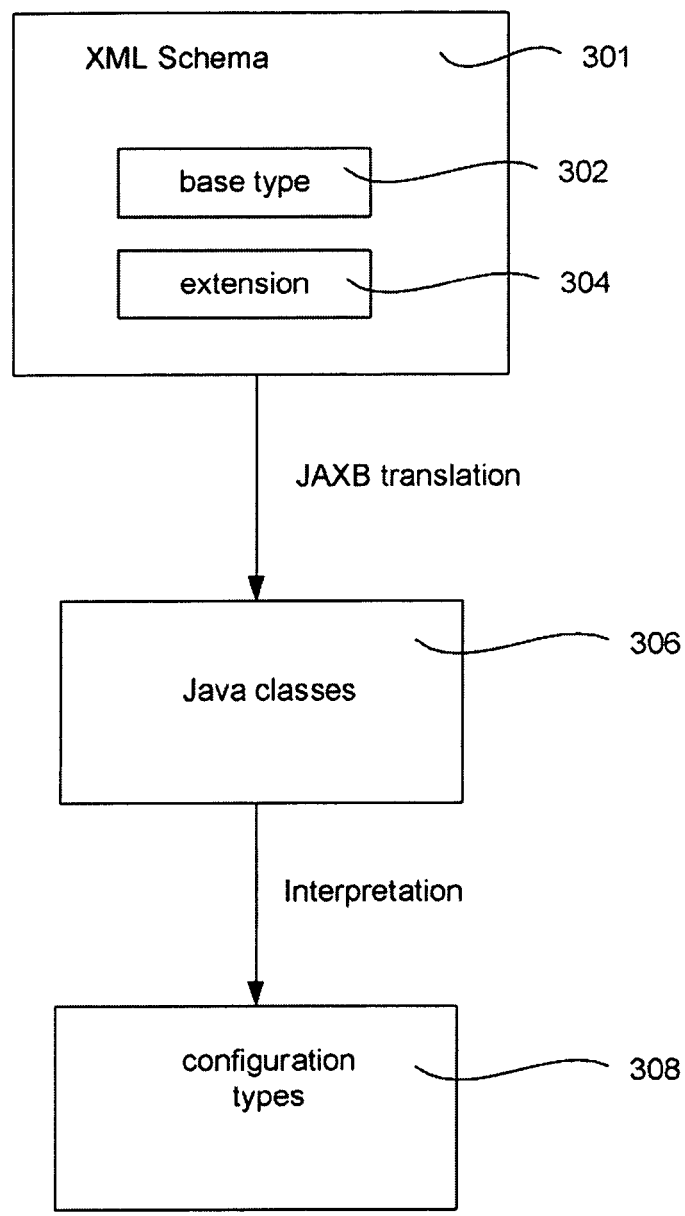
FIG. 3 illustrates an example of a use of XML schema to extend the configuration system of one embodiment of the present invention.

FIG. 3 shows an example where XML schema 301 includes base type schema 302 and extension 304 produced by the component designer.

A JAXB translation can be used to create the JAVA classes 306 for a component. These JAVA configuration classes can be interpreted to determine the configuration type 308.

Figure 4:
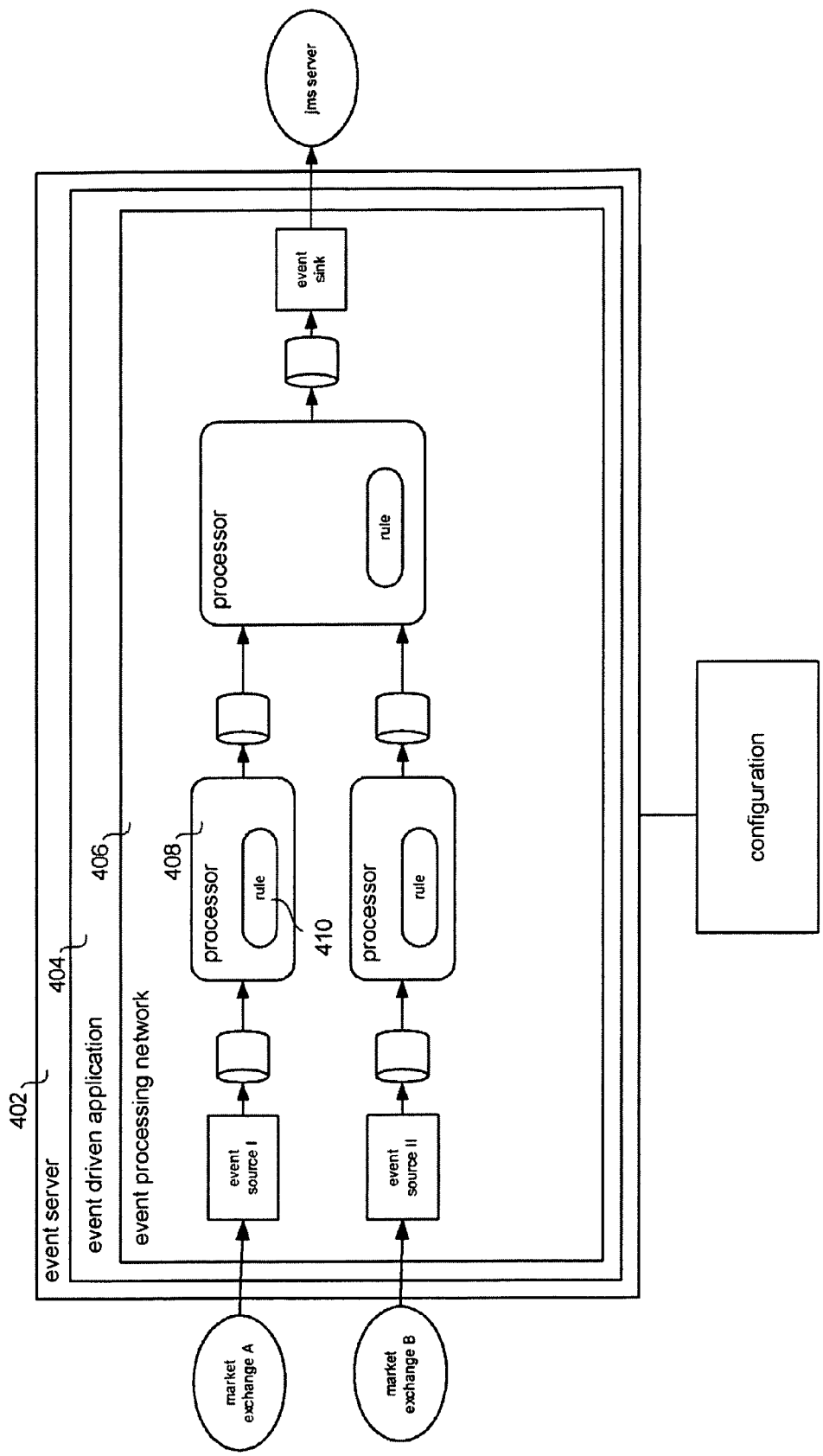
FIG. 4 illustrates an exemplary event server of one embodiment.

FIG. 4 shows an event server 402 running an event driven application 404 implementing an event processing network 406. The event server can be like the event server described in the provisional application entitled "EVENT PROCESSING LANGUAGE", by Alexandre de Castro Alves, et al., filed Sep. 11, 2007, U.S. patent application Ser. No. 60/971,460, incorporated herein by reference.

The event processing network 406 can include at least one processor 408 to implement a rule 410 on at least one input stream. The event processing network 406 can define the concurrent operation of at least two components of the event processing network.

The processor 408 can implement rules. The rules can be written in an Event Processing Language, such as the event processing language described in the provisional application "Event Processing Language", by Alexandre de Castro Alvez, et al., filed May 29, 2007, U.S. patent application Ser. No. 60/940,655, incorporated herein by reference.

The streams can include queues to store events. The events can be sent from the queues into processors. Event sources and sinks can provide and consume events respectively. Adapters can be used to connect to event sources.

The following describes Configuration Management for a Realtime Event Server. Configuration Management in the Realtime Event Server can be built on top of mSA. Configuration changes can be transactional. The configuration system itself can be extensible by customers.

An individual realtime server can consist of a single JVM process with WLRT modules running on top of a microServices Architecture (mSA). Several (zero or more) realtime applications may be simultaneously deployed to a realtime server instance.

A realtime application can be packaged as a Single OSGi bundle. Libraries and services that are shared by applications may be packaged as separate OSGi bundles. An application can contain an Event Processing Network composed of a set of event source(s) and listener(s) that are wired together. These event sources and listeners can be referred to as nodes. An event source may be shared among applications.

There can be dynamic configuration data associated with both the realtime server and individual applications that need to be managed, i.e. created/deployed and updated dynamically while the server is running. Static configuration data that can be also contained within the Spring application context file within an application bundle. To support remote configuration and management, JMX interfaces can be exposed. A scripting solution can also be implemented to expose the JMX interfaces in a standard way.

Configuration data can be stored in files. Each configuration file can define a set of configuration objects that are each of a particular configuration type. The set of configuration types that may be used can be extended by customers. The extension facility can be used when customers define their own adapters that require customized configuration data. Dynamic changes made to configuration data while the server is running can span built-in and custom types and can always be transactional, i.e. either all of the changes made during a session with the configuration manager are visible or none of them are once the session completes.

The configuration management system for a realtime event server can be built on top of the support for configuration management that is provided by other mSA. All configuration data can be stored in files. The Simple Configuration Provider (SCP) can be used to read configuration data and notify the Configuration Manager (CM) of changes in the underlying data.

Dynamic changes to configuration data can flow bottom up from SCP through the CM to listeners that are registered with the CM. The notion of a session with the configuration management system can be supported. Changes to configuration data made during a session can be atomic, i.e. either all of the changes will take effect or none of them will.

Dynamic configuration changes can be made in a number of ways: via MBeans, via scripting, and also by accessing the SessionManager service of the configuration system directly. The SessionManager service can be an OSGi service. Changes made using MBeans and the scripting interface can flow through the SessionManager as well, so the SessionManager service can be the entry point for all dynamic changes and provides an API for beginning, committing, and rolling back a Session. The Session interface can provide APIs for retrieving the current state of a configuration object and for updating that state.

In one embodiment, only one session will be able to make changes to a particular configuration object at a time. A version-based concurrency control scheme can be used to enforce this. Using version-based concurrency control will allow multiple concurrent readers of the same configuration object. However, if two Sessions try to modify the same version of a particular configuration object then one of the Sessions will fail (in one embodiment, first updater wins) if both attempt to commit their changes. There need be no timeouts associated with Sessions that are updating the server configuration, so Sessions can be long-running, if desired. In one embodiment, administrators should be careful to end Sessions that they begin, in order to avoid creating unnecessary in memory state in a running server.

Server-level configuration data can be stored directly in the 'config' directory which is a child of the domain directory. Application-level configuration data can be stored in files in a per-application directory under the 'applications' directory which is a child of the domain directory. The name of this per-application subdirectory can be the same as the application name, which can also the same as the application bundle's symbolic name.

The example below shows a sample domain directory structure. There can be a single config.xml file in the config directory which contains definitions of configuration objects that configure server level behavior. The name and location of this file can be fixed and can be unchangeable by the customer. There are two applications deployed in this example: application1 and application2. Application1 uses a single configuration file for all of its configuration data. The name given to application configuration files is not specified—it can be anything the customer wants as long as the .xml file extension is used. Customers may also factor their configuration data into multiple files as is shown for application2. Application2 uses one file to contain processor configuration data and another for the remaining configuration data for the application. In general, any number of configuration files can be used for an application.

In one embodiment, a particular configuration object must be completely defined in a single file, however. Its definition cannot be split up among multiple files. The name used for each configuration object must be unique within an application, but can be reused across applications.

Exemplary partial domain directory structure showing configuration directories.

```
/mydomain
  /config
    config.xml
    security.xml
  /applications
    /application1
      applicationConfig.xml
    /application2
      applicationConfig.xml
      processorConfig.xml
```

In one embodiment, the only configuration artifacts that are associated with the server as a whole are the config/config.xml and config/security.xml files. These files can contain Simple Configuration Provider (SCP) data that configures components at the server level. These components can include, but are not limited to, work managers, network I/O, logging, and clocks, for example. Jetty configuration is another example of server level configuration that can be supported.

There are additional security files that will be stored in the domain directory, but these can be accessed using security APIs and need not managed by the configuration management system.

An XML schema can define the exact contents of the server-level config.xml file.

An application can be associated with zero or more configuration files. Each file can be stored in the application's configuration directory. When an application is deployed the initial configuration files may be deployed also and will be copied into the application directory under the 'applications' directory.

If no initial configuration is specified for a node in the event processing network, but configuration data is subsequently added dynamically, the data can be stored in the application directory with the filename <node name>.xml.

The configuration data contained in an application configuration file(s) can be used to configure adapters and processors that are part of the event processing network of the application. No restrictions need be placed on which configuration file must contain the configuration data for a particular adapter or processor. A single file may be used for all of the configuration data in the application, for example. Or at the other extreme, the data for each adapter or processor may be placed in its own configuration file. In one embodiment, all of the data for an individual adapter or processor must be contained in the same file.

A set of rules can be configured for processor and a set of subscriptions can be configured for an adapter.

Note that when we talk about the configuration files for an application in this document we generally are not talking about the Spring configuration files that are used to define the topology of the event processing network for the application. The Spring configuration files need not support dynamic updates and need not be managed by the configuration management system. Spring configuration files can be packaged within the application bundle and need not reside in the application's configuration directory. They can be read by Spring when the application is deployed. The structure of the event processing network can be static and need not be changed without redeploying an application.

The format of application configuration files can be defined using XMLSchema. The configuration types defined by the schema can be mapped to Java classes using JAXB 2.0. A base XMLSchema can be extended by customers with their own configuration types. The example below shows a sample configuration file that configures an adapter.

```
<config>
  <Adapter>
    <name>trackdata</name>
    <Symbols>
      <Symbol>BEAS</Symbol>
      <Symbol>IBM</Symbol>
    </Symbols>
  </Adapter>
</config>
```

Sample Application Configuration File.

This approach to configuration management can allow a developer to create the application configuration files using an IDE. A developer can iteratively make changes to the configuration files and application code using the IDE and then redeploy the application to see what effect the changes have. Alternatively, a developer may deploy the application once and then make dynamic changes to the configuration while the application is deployed. In this scenario, a developer will likely want to avoid copying the configuration files to the domain directory and instead have them updated in place in the developer's source tree.

Configuration data for different components may need to be stored in separate files and versioned separately, since there may be a lot of configuration data. A typical processor may have thousands of rules for example. Storing configuration in separate files also has the advantage that a single massive file doesn't need to be updated for each dynamic configuration change.

For production applications, the initial configuration files can be deployed along with the bundle that contains the application code. The configuration may be updated dynamically while the production application is running, using JMX for example.

In one embodiment, it will be possible to launch the Event Server from any directory as long as the domain home directories specified. We provide two ways to set the domain home. An environment variable, WLEVS_DOMAIN_HOME, and a system property, wlevs.domain.home. The value of the system property can override any valuable set for the environment variable.

Customers can do a number of things in order to provide a custom adapter. Foremost, they can need to provide a Java class that is their adapter implementation. This class can implement the interface com.bea.wlrt.ede.StreamingDataSourceConnector which represents the contract between the custom adapter and the configuration system.

In addition, customers can extend the basic XMLSchema with a new configuration type for their adapter. The customer can use JAXB to generate a Java class that corresponds to their new configuration type. Instances of this class will be instantiated and used to pass configuration data to the implementation of their custom adapter. Instances of this class are also used when making dynamic configuration updates. In other words, they may be retrieved from and passed to a Session.

Customers can provide their own mBean for their custom adapter. The mBean class can be packaged in the application bundle and follow standard mBean naming conventions.

The configuration management code can be packaged as part of an ede bundle.

A wrapper class can be used around a CE backplane. In one embodiment, this can do the following If the directory is empty, create a domain. This can involve creating a directory structure, a salt file, launch.xml (containing all WLRT runtime modules), and config.xml (initially blank)

prompting for an administrator username and password for the domain, and encrypting this and store on disk.

If the launch.xml file is broken, or doesn't contain our artifacts, error and return Call the Core Engine Launcher The startup command for the server can be java com.bea.wlrt.Server Also supported can be a startup syntax like JAVA—jar wlrt.jar The Java interfaces for the configuration management system can be the SessionManager and Session interfaces.

Custom adapters can implement com.bea.wlrt.ede.StreamingDataSourceConnector.

Management bean interfaces can be defined for our out-of-the-box adapters and processors. The management beans can be registered in the com.bea.wlrt.runtime domain in the default MBean server.

MBean interfaces can be defined for server level artifacts like work managers, clocks, jetty, configuration manager lock timeout, etc.

MBeans can be provided for managing installed applications. Operations that can be provided can include uninstall, install, start, and stop.

The base XML schema for application descriptors can be wlrt_application.xsd.

Scripting can be supported by
1. Defining a generic binary module with specific verbs for our functions
2. Recommending (within documentation and samples) a specific scripting language for use
3. A simple wrapper around the recommended language can be provided JRuby can be the recommended scripting language.
Scripting verbs can include:

| Verb | Usage |
| --- | --- |
| connect | Connect to a given server. |
| upload | Upload a given file to the server. If a file by that name is already there, we overwrite it. This will support remotely uploading applications and config files to the server |
| install | Install an application. |
| update | Update a given application (by name). |
| start | Start an application. |
| stop | Stop an application. |
| uninstall | Uninstall an application. |
| apps | Show all applications that are currently installed. |
| setApp | Set the current app we are working with. |
| nodes | Show all nodes in this application (value of app must be set). |
| listeners | Show all listeners for current node. |
| sources | Show all sources sending events to the current node. |
| goto | Go to a node in the network. (Seth: should we call this setNode?) |
| pointer | Refers to a proxy to the manageable MBean, currently pointed to. |
| subscribe | Subscribe to a symbol. |
| unsubscribe | Unsubscribe from a symbol |
| addRule | Add a rule to a processor node. |
| disconnect | Close the scripting connection. |

In one embodiment:
1 pointer( ) always points to an object.
  A. It is always a node in the network
  B. When we goto a node, the pointer is reset
  C. Since each node has a unique name, we can jump to it.
1. if pointer is null, but an application is selected
2. Every node knows the application that created it
3. If no app is set, then we always show all nodes (and show the app name as a column)
4. If an app is set, then we only show sources and listeners for that app
5. The network is not a tree (since each node might have multiple sources ie multiple parents)
6. Each app has a name, which is given to it at deployment time
7. The proxy exposed via pointer, is actually a proxy supporting the following
  A. All the MBean interfaces exposed for the node Below, we will show a sample script with output
WLRT server is on machine wlrtserver, listening on port 9005
Admin is a on machine wlrtclient
These samples use jython

```
JAVA com.bea.wlrt.ScriptTool (this is a light wrapper around JRuby)
>>>wlrt = WLRTSession.new
```

```
>>> wlrt.connect("iiop://wlrtserver:9005", "weblogic", "weblogic")
Connecting to iiop://wlrtserver:9005 as user weblogic ... successful
Upload successful
>>> wlrt.install("myapp", "myapp.jar")
Install successful
>>> wlrt.apps( )
Name       Status    Source
GlobalApp  ACTIVE    c:/myapps/myapp.jar
App2       STOPPED   c:/myapps/appnext.jar
>>> wlrt.setApp("App2")
>>> wlrt.network( )
Type      Name       Subscriptions    Num Rules
Adapter   reuters1 -      -
Adapter   netware1 -     -
Stream    s1         [BEAS, IBM]      -
Stream    s2         [NOVL, RHAT]     -
Processor p1 -         4
ClientPojo c1 -          -
>>> wlrt.listeners( )
Type      Name
Adapter   reuters1
Adapter   netware1
>>> wlrt.sources( )
nil
>>> wlrt.goto("reuters1")
Reuters Adapter: reuters1. ... (anything from the toString( ))
>>> wlrt.pointer( )
Reuters Adapter: reuters1. ... (anything from the toString( ))
>>> wlrt.listeners( )
Type      Name       Subscriptions
Stream    s1         [BEAS, IBM]
Stream    s2         [NOVL, RHAT]
>>> wlrt.goto("s1")
Stream: s1 with subscriptions (BEAS, IBM)
>>> wlrt.listeners( )
Type      Name       Type    Num Rules
Processor p1         Esper   4
>>> wlrt.sources( )
Type      Name
Adapter   a1
ClientPojo c1
>>> wlrt.setApp(None)
>>> wlrt.goto("app2/p1")
>>> wlrt.addrule("select when BEAS > 15.0")
>>> wlrt.goto("app2/reuters1")
>>> wlrt.listeners( )
Type      Name       Subscriptions
Stream    app2/s1    [BEAS, IBM]
Stream    app2/s2    [NOVL, RHAT]
>>> wlrt.subscribe(["s1", "app2/s2"], ["BEAS", "IBM"])
>>> wlrt.disconnect( )
>>> exit
```

In one embodiment, the configuration management system can store persistent data in two places. Configuration data can be stored in the config directory which is a child of the domain directory. In addition, a place can be used to store temporary data for sessions that is used to make sessions atomic. This data can be stored in the system directory which is also a child of the domain directory. Each subsystem of the server can be able to have its own subdirectory in the system directory. The subdirectory for the configuration management system can be named "management". The following shows an example of persistent session data in the domain directory.

```
/mydomain
 /system
  /management
   /session_state
   /session1
   /session2
```

In this example, there are two active sessions. The session_state directory is used to keep track of the state of each session. Valid states can be OPEN, COMMITTING, COMMITTED, ROLLINGBACK, ROLLEDBACK.

Users can be required to provide administration credentials before they are allowed to access the configuration management system.

Configuration changes can be persistent and can survive a server crash. If the server crashes while a session is in the COMMITTING or ROLLINGBACK state, then the changes for the session can be applied or rolled back atomically when the server restarts.

FIG. 2 shows the basic flow at run time of configuration changes. Changes can begin from a Session, MBean, or script and can be persisted to a set of configuration files. Copy-on-write can be done for each file so that changes can be rolled back. Once the changes have been persisted into a set of files the configuration provider can be notified and used to propagate the changes to the configuration manager and then ultimately to adapters and processors.

Embodiments of the present invention can include computer-based methods and systems which may be implemented using conventional general purpose or a specialized digital computer(s) or microprocessor(s), programmed according to the teachings of the present disclosure. Appropriate software coding can readily be prepared by programmers based on the teachings of the present disclosure.

Embodiments of the present invention can include a computer readable medium, such as computer readable storage medium. The computer readable storage medium can have stored instructions which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory or any media or device suitable for storing instructions and/or data. The present invention can include software for controlling both the hardware of a computer, such as general purpose/specialized computer(s) or microprocessor(s), and for enabling them to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer-implemented method for transmitting the code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

The invention claimed is:

1. A system for managing configuration at a realtime event server comprising:
  a computer including a processor and computer readable storage medium;
  a realtime event server, executing on the computer, which operates on data received as event streams, wherein the realtime event server includes
    an application that operates on the data in the event streams, wherein the application includes one or more configurable components therein, and wherein each of the configurable components
      is associated with a configuration listener, and
      includes one or more classes, each said class further including lifecycle methods for updating each said component with a dynamic configuration, the lifecycle methods including a prepare lifecycle method, an activate lifecycle method and a rollback lifecycle method, and
    a configuration system that is adapted to
      retrieve the dynamic configuration from a storage,
      supply the dynamic configuration, via the configuration listener, to the each said component, and
      map the dynamic configuration to the one or more classes; and
  wherein the configuration system calls, via the configuration listener, the lifecycle methods in the each said component to prepare to make the updates, activate the updates without restarting the component, and roll back the updates if necessary.

2. The system of claim 1, wherein at least one of the configurable components is a realtime event processor.

3. The system of claim 1, wherein at least one of the configurable components is an adapter.

4. The system of claim 1, wherein the one or more classes are JAVA classes derived from an XML schema.

5. The system of claim 1, wherein the dynamic configuration is put into a configuration manager that acts as an in-memory database.

6. The system of claim 5, wherein the configuration listener supplies the dynamic configuration from the in-memory database to the each said component.

7. The system of claim 4, wherein the XML schema includes base type schema that can be extended via a component designer.

8. A method of providing a realtime event server, comprising the steps of:

providing, at a computer including a processor and computer readable storage medium, a realtime event server, which operates on data received as event streams, wherein the realtime event server includes an application that operates on the data in the event streams, wherein the application includes one or more configurable components therein, and wherein each of the configurable components is associated with a configuration listener, and includes one or more classes, each said class further including lifecycle methods for updating each said component with a dynamic configuration, the lifecycle methods including a prepare lifecycle method, an activate lifecycle method and a rollback lifecycle method, and a configuration system that is adapted to retrieve the dynamic configuration from a storage, supply the dynamic configuration, via the configuration listener, to the each said component, and map the dynamic configuration to the one or more classes; and calling, via the configuration listener, the lifecycle methods in the each said component to prepare to make the updates, activate the updates without restarting the component, and roll back the updates if necessary.

9. The method of claim 8, wherein at least one of the configurable components is a realtime event processor.

10. The method of claim 8, wherein at least one of the configurable components is an adapter.

11. The method of claim 8, wherein the one or more classes are JAVA classes derived from an XML schema.

12. The method of claim 8, wherein the dynamic configuration is put into a configuration manager that acts as an in-memory database.

13. The method of claim 12, wherein the configuration listener supplies the dynamic configuration from the in-memory database to the each said component.

14. The method of claim 11, wherein the XML schema includes base type schema that can be extended via a component designer.

15. A non-transitory computer readable storage medium, including instructions stored thereon which when read and executed by one or more computers cause the one or more computers to perform the steps comprising:

providing, at a computer including a processor and computer readable storage medium, a realtime event server, which operates on data received as event streams, wherein the realtime event server includes an application that operates on the data in the event streams, wherein the application includes one or more configurable components therein, and wherein each of the configurable components is associated with a configuration listener, and includes one or more classes, each said class further including lifecycle methods for updating each said component with a dynamic configuration, the lifecycle methods including a prepare lifecycle method, an activate lifecycle method and a rollback lifecycle method, and a configuration system that is adapted to retrieve the dynamic configuration from a storage, supply the dynamic configuration, via the configuration listener, to the each said component, and map the dynamic configuration to the one or more classes; and calling, via the configuration listener, the lifecycle methods in the each said component to prepare to make the updates, activate the updates without restarting the component, and roll back the updates if necessary.

16. The system of claim 1, wherein the dynamic configuration is stored in configuration files, and wherein each configuration file defines a set of configuration objects.

17. The system of claim 16, wherein updates to the configuration objects are made in sessions, and wherein a version-based concurrency control scheme is used to allow multiple concurrent reads of a same configuration object, and to control which of multiple sessions are currently allowed to commit changes to a particular configuration object.

18. The method of claim 8, wherein the dynamic configuration is stored in configuration files, and wherein each configuration file defines a set of configuration objects.

19. The method of claim 18, wherein updates to the configuration objects are made in sessions, and wherein a version-based concurrency control scheme is used to allow multiple concurrent reads of a same configuration object, and to control which of multiple sessions are currently allowed to commit changes to a particular configuration object.

* * * * *

UNITED STATES PATENT AND TRADEMARK OFFICE
CERTIFICATE OF CORRECTION

| | | |
|---|---|---|
| PATENT NO. | : 8,738,746 B2 | Page 1 of 1 |
| APPLICATION NO. | : 12/014914 | |
| DATED | : May 27, 2014 | |
| INVENTOR(S) | : White et al. | |

It is certified that error appears in the above-identified patent and that said Letters Patent is hereby corrected as shown below:

In the Specification

In column 2, line 65, delete "Alvez," and insert -- Alves, --, therefor.

Signed and Sealed this
Ninth Day of December, 2014

Michelle K. Lee
*Deputy Director of the United States Patent and Trademark Office*